Patented Nov. 12, 1935

2,020,662

UNITED STATES PATENT OFFICE 2,020,662

PROCESS FOR THE PRODUCTION OF PHOSPHATIDE PREPARATION

Albert Schwieger, Hamburg, Germany, assignor, by mesne assignments, to American Lecithin Company, Cleveland, Ohio, a corporation of Ohio No Drawing. Application August 23, 1934, Serial No. 741,181. In Germany June 8, 1933

9 Claims. (Cl. 260—99.20)

The invention concerns a process for the production of phosphatide preparation utilizing alkali.

When phosphatides, such for example as are obtained in soya oil manufacture, with a content of 10 to 50% water, are provided with an addition of alkali lye and the mixture evaporated to pasty consistency, the product obtained shows a capacity for ready emulsification and is practically stable.

It has now been surprisingly found that phosphatide products utilizable as emulsion producing material and the like can be obtained by trituration of phosphatides with solid alkali.

Example 1

10 kgs. of phosphatide, such as is obtained in the extraction of soya oil, with a content of 30 to 60% phosphatide, 30 to 50% oil and 5 to 25% water are admixed with 1.85 kgs. solid pulverized caustic soda in a mixing machine with gentle warming to about 30 to 40° C. to a homogeneous mixture. If the initial phosphatide has only a small content of water, a dry pulverulent product results. With a higher water content, for example 25% or more, the mass generally remains pasty. It can then be dried on roller dryers or the like in vacuo and then pulverized.

Example 2

10 kgs. of phosphatide from fish roes with about 40% phosphatide and 60% oil are intimately mixed with 2 kgs. of pulverized dried caustic soda. It is preferable during the mixing to warm the mass gently. The product is pulverulent and dissolves directly in water or other liquids to stable emulsions.

Example 3

1 kg. of soya phosphatide in practically anhydrous and oil-free condition with a content of about 92% phosphatide are intimately mixed in a mixing machine or colloid mill with 0,17 kg. caustic soda with warming to about 25° C. The product obtained is particularly suitable for use in those circumstances where oil is undesirable.

The removal of oil from the phosphatide can be effected with acetone, acetic ester or similar organic solvents. Also alcohol is suitable for this purpose also this dissolves a part of the phosphatide. With the use of a solvent, such as alcohol, which is not saponified or polymerized by alkali, the oil-freed phosphatide containing the solvent can be mixed with the alkali and the alcohol removed subsequently.

Also according to the invention the residue of the phosphatide insoluble in alcohol gives with alkali a product, which is suitable for emulsification purposes. The oil-freed residue of the alcohol extraction when mixed with alkali while still in the alcohol-moist condition, and the alcohol residue evaporated, is partly saponified. In this manner a true soap is obtained which further increases the emulsifying action of the product.

The phosphatide products obtained are remarkable in that they can be obtained in pulverulent condition and that they easily dissolve in water or other aqueous liquids to give stable emulsions in the same manner as soap powder or the like.

It has further been found that the products according to the present invention are very stable and that the phosphatides appear to be protected against destruction by fermentation or the like by the presence of the alkali, so that preservatives are not necessary.

The products according to the present invention find use for many purposes for example in the textile industries, for the production of asphalt emulsions or the like for road construction and the like.

I claim:

1. Process for the production of phosphatide preparations which includes the step of adding to phosphatide containing not over 50% of water at least 10% of solid alkali metal hydroxide.

2. Process for the production of phosphatide preparations which includes the step of causing solid alkali metal hydroxide to act upon phosphatide containing less than 5% by weight of water.

3. Process for the production of phosphatide preparations which includes the step of causing alkali metal hydroxide to act upon oil-freed raw phosphatide.

4. Process for the production of phosphatide preparations which includes the step of adding to phosphatide containing not over 50% of water at least 10% of solid alkali metal hydroxide in pulverulent condition.

5. Process for the production of phosphatide preparations which includes the step of causing solid alkali metal hydroxide to act upon phosphatide containing between 5 and 25% water and drying the pasty product in vacuo.

6. Process for the production of phosphatide preparations which includes the step of treating raw phosphatide with fat solvent which practically does not dissolve phosphatides, removing the major portion of the solvent, adding solid alkali metal hydroxide to the residue containing the remainder of the solvent and evaporating such remainder.

7. Process for the production of phosphatide preparations which includes the step of treating raw phosphatide with alcohol, removing the major part of the alcohol, subjecting the residue containing the remainder of the alcohol to the action of solid alkali metal hydroxide and removing such remainder.

8. Process for the production of phosphatide preparations which includes the step of treating raw phosphatide with unsaponifiable organic solvent, removing the major part of the solvent adding to the residue containing the remainder of the solvent solid caustic alkali metal hydroxide and removing such remainder.

9. Phosphatide preparations containing phosphatide treated with at least 10% of solid alkali metal hydroxide and containing less than 50% of water.

ALBERT SCHWIEGER.